April 23, 1929.  A. MARTIN  1,710,369
MEANS FOR ORNAMENTING FOODSTUFFS
Filed Oct. 15, 1927
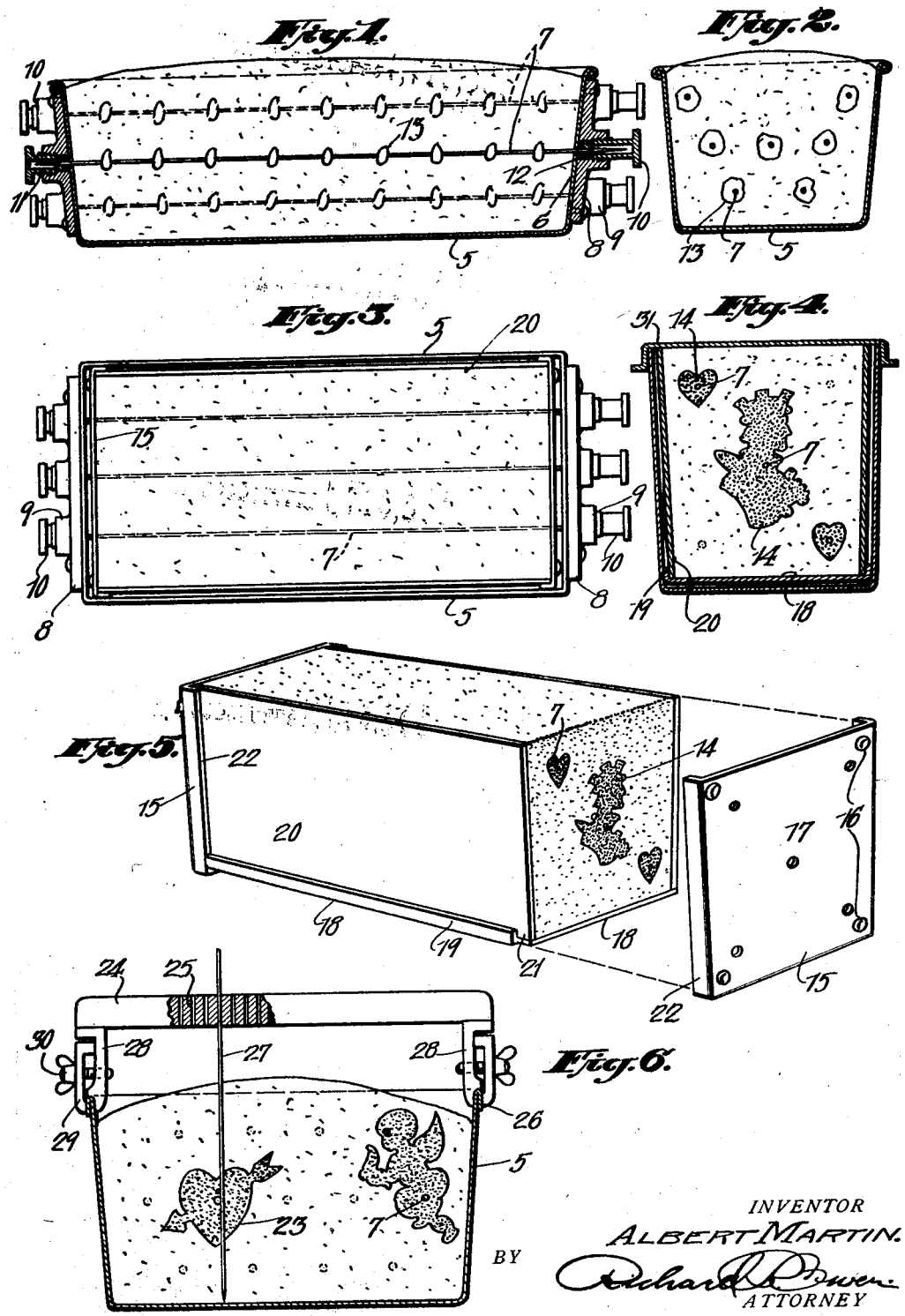
INVENTOR
ALBERT MARTIN.
BY
ATTORNEY Patented Apr. 23, 1929.

1,710,369

UNITED STATES PATENT OFFICE.

ALBERT MARTIN, OF NEW YORK, N. Y.

MEANS FOR ORNAMENTING FOODSTUFFS

Application filed October 15, 1927. Serial No. 226,447.

This invention relates to a method for ornamenting foodstuff and to the means for carrying out such ornamentation.

A particular object of the invention is to provide a method and means for carrying out this ornamentation by providing a container in which cake, jelly, ice cream, candy or other edibles are formed in a particular shape and means also being provided for carrying ornamental features whereby the latter may be left embedded in the foodstuff after the same has been completely prepared.

A further object of the invention is to provide a means for placing of a design, such as a name, for instance, or picture or any fanciful design in the body of the jelly, cake, ice cream, or the like, so that the same will be continuous throughout and when the foodstuff is cut in slices, the particular design may show in the sliced piece, thereby enhancing the appearance of the foodstuff.

To enable others skilled in the art to fully comprehend the underlying features of my invention that they may embody the same in the various modifications in structure and relation contemplated, a drawing depicting a preferred form has been annexed as a part of this disclosure and in such drawing, similar reference characters denote corresponding parts throughout all the views, of which, Figure 1 is a view in longitudinal cross section, certain parts being shown in side elevation, to illustrate a container in which foodstuff may be prepared, the view showing the ornamenting members embedded therein so that when the cake or other food is sliced, the ornamentations will appear.

Figure 2 is a view in sectional elevation, the section being taken through the center of the container as illustrated in Figure 1 and showing the formation of the design as it would appear in the foodstuff when cut.

Figure 3 is a view in top plan of a modified form of container having an inner knock-down receptacle.

Figure 4 is a view in sectional elevation, showing my improved container as illustrated in Figure 3, a cover being provided for the same and the inner knock-down receptacle being shown in its position relative to the outer container.

Figure 5 is a view in perspective of the inner receptacle, one end thereof being shown removed to disclose how, when a brick of ice cream is made, for instance, the design would appear therein, and Figure 6 is a still further modified form of my invention showing the use in connection with a baking pan or other foodstuff forming container, of a bridge through which pins are vertically positioned to retain the ornamenting members in the foodstuff so that they will not revolve or move during the baking or freezing or setting of the foodstuff.

Referring to the drawings in detail, 5 indicates a container which is made of suitable metal or other material and which is provided with openings in its end walls 6 through which the ornament carrying rods or pins 7 are adapted to pass. The end walls 6 of the container have riveted thereto or secured in any other suitable manner, the plates 8, these plates having formed thereon, the bosses 9 which are threaded internally to receive the plugs 10. These plugs are provided with a bore 11 in their interior for the reception of the ends of the pins 7 and in order to make the container liquid-proof or leak-proof, there is provided suitable cork inserts 12 which are compressed about the ends of the pins 7 by the turning up of the plug members 10.

It will be noted that at one end of the pan, the plug members 10 are of greater length than at the opposite end of pan, this provision being made to allow for withdrawal of pins 7 which may be employed to carry the ornamenting members.

The method of manipulation has been fully explained in my Patent Number 1,624,670 granted to me on April 12, 1927, and, as set forth therein, the rods 7 are adapted to receive suitable ornamenting members 13 which may be in separate pieces, as illustrated in Figure 1 or may be a solid, continuous member, as illustrated in Figure 4, being made in a suitable die or mold and having passed centrally therethrough, the pin members 7. The pin with the decoration thereon is then placed into the openings in the ends of the container 5 and the plug members 10 are threaded into position in the bosses 9, thus securely holding the pins 7 longitudinally of the pan so that when the foodstuff is placed therein, such as dough, jelly, ice cream or the like, the same may be baked or prepared in the usual manner, in the pan or container and when the process has been completed, the plugs 10 are simply removed, and the pins drawn out, thus leaving the ornaments embedded in the body of the foodstuff.

In the form shown in Figures 3, 4 and 5, I have provided a device particularly adapted for the freezing of ice cream or the making of candy, wherein it is necessary that the walls of the container be separated from the foodstuff or shaken off the foodstuff after the same has been completed. In candy, which is of a very sticky nature, when the same has been molded, it is difficult to get it out of a pan without breaking and consequently, I have devised a means whereby ice cream or candy or the like may be molded to any suitable shape and the receptacle containing the same, being of a knock-down nature, can be readily separated from the foodstuff without breaking it up. To this end, I have provided a container 5 as described with relation to Figure 1 and Figure 2 having the end plates 8 thereon, bosses 9 and plugs 10, the pins 7 being held in exactly the same manner and, in connection with which it is not believed, any further explanation is necessary, it being sufficient to say that the ornamenting member indicated by the numeral 14, in this instance, may be made of fruit, candy or other edible and may be formed in a longitudinal mold, so that the pins 7 may be passed longitudinally therethrough to hold the same at any desired position within the container 5.

However, in order to take the contents out of the container without breaking the same, I have provided an inner receptacle of knockdown nature, comprising end walls 15, having formed on the outer surface thereof, the spacing proturberances 16, the object of the latter being to space the end wall 15 from the end wall 6 of the receptacle or container 5. It will be noted in this respect that the end wall 15 is provided with the openings 17 which will match all of the openings in the end wall 6 of the container 5, thus allowing for the passage of the pins 7, not only through the end walls 15 of the inner receptacle but also through the wall 6 of the container 5, so that they can be effectively locked in position during the preparation of the foodstuff.

The knock-down container further comprises a bottom 18, formed on its side edges with the ledges 19, these ledges imprisoning the bottom edges of the side 20 which go to make up the knock-down receptacle, and it will be noted that the ledges 19 are cut back from the ends of the bottom 18, as at 21 to allow for the flanges 22 on the end members 15 fitting over the bottom 18, as it will be readily seen that the bottom 18 fits into the end pieces 15 while the sides 20 of the receptacle do likewise, and the ledges 19 prevent leakage of any liquid matter that may be placed in the receptacle.

It is of course evident that any shape of receptacle may be employed and any shape of container may be used to suit the purpose and while I have shown one of rectangular formation, it is to be understood that I am not limited to shape as the container might be made of triangular formation or in heart shape or in any other form desired.

It is quite evident that in the construction of my inner receptacle which snugly fits into the outer container 5, that ice cream, candy or the like may be frozen therein or be prepared therein with the design 14 firmly embedded and when the foodstuff is completed, the receptacle is taken out of the container 5 and the parts thereof may be readily separated to present the foodstuff in its completed form without breakage and ready for slicing or cutting up and in this respect, it will be noted that each and every slice, no matter how think or thick, will show therein, the outline of the ornament 14, thus enhancing the appearance of the foodstuff and making it particularly adapted for individual use at parties, receptions and the like.

In Figure 6, I have shown a further modified form of invention which consists in the use of the pan 5 as illustrated in Figures 1 and 2, and the use of rods 7 carrying ornamenting members 23 thereon. In order to prevent any possible revolving movement of the ornamenting members 23 on the carrying rod 7, I have provided a bridge 24 having openings 25 therein, this bridge being positioned on the top edges 26 of the pan 5 and in position to extend transversely thereacross so that vertical pins 27 may be passed downwardly through the openings 25 in the bridge and through the ornamenting members 23 to hold the latter in position and prevent their revolving during the baking or setting process of the foodstuff, as it will be quite evident that in setting, freezing or baking, the foodstuff itself will have a tendency to expand and consequently, will have a tendency to move the ornamenting member about the pins 7. The bridge 24 is provided with end legs 28 forming one jaw of a clamp member, the opposite jaw being indicated as at 29 and both the portions 28 and 29 being held together through the medium of a suitable clamp nut 30.

It is quite evident, therefore that any number of bridges 24 may be used transversely of the pan 5 and any number of pins 27 may be dropped down through the bridge 24 to pass through the ornamenting members 23 to retain the same in their proper position.

It is quite evident, of course, that the bridge 24 may be just as well used in the double type of pan wherein the container 5 holds the inner receptacle in position. In this event, the bridge would be clamped to the outer pan 5 and the pins 27 would be extended downwardly through the foodstuff into the design 14.

While I have shown one particular form of design in connection with my invention, it is to be understood that any ornamenting foodstuff may be employed, either in the nature of blocks or in the nature of a continuous strip of ornamenting foodstuff passing through the body of the cake or other article which may be made up in the container.

It is also evident that in the formation of candy, the inner receptacle might be made up in a plurality of compartments having pins passing therethrough and the pins holding a particular ornamenting member in each compartment so that when the candy is formed therein, the ornamenting member will be embodied in the body thereof.

It is also evident that candy, ice cream or other edibles may be conveniently formed in the inner receptacle and can be removed from the container without breakage or without destroying the shape thereof. This is also true of jelly, which congeals at a low temperature but which is not very solid and which cannot be removed from an ordinary pan without breaking. In my device, the inner receptacle can be removed from the container and then the ends and sides and bottom may be removed to leave the jelly mold in its complete state, it of course being understood that before the inner container is removed, the pins will be drawn out of the container in the manner described, by removing the plug 10 at one end of the pan.

It is also evident that by employing a cover 31 which snugly fits the top of the container 5, the contents may be transported in its mold and may be kept in sanitary condition preparatory to using.

While I have illustrated and described my invention with some degree of particularity, I realize that in practice various alterations therein may be made. I therefore reserve the right and privilege of changing the form of the details of construction or otherwise altering the arrangement of the correlated parts without departing from the spirit of the invention or the scope of the appended claims.

Having thus described my invention, what I claim as new and desire to secure by United States Letters Patent is:—

1. A means for ornamenting foodstuff comprising a container, a knock-down receptacle in said container, rods extending between the walls of the container and receptacle and adapted to carry ornamenting members and the walls of the container and the receptacle being provided with openings through which the rods may be removed whereby the ornamenting members are left embedded in the body of the foodstuff.

2. A means for ornamenting foodstuff which comprises a container, a knock-down receptacle in said container in which the foodstuff is prepared, the opposite walls of the container and the receptacle being provided with openings, rods passing through said openings and adapted to carry edible members arranged in design formation, plates attached to said container wall, rod holding members in said plates, said members being removable whereby the rods can be drawn out of the container and the receptacles to leave the edible pieces embedded in the foodstuff.

3. A means for ornamenting foodstuff comprising a container, rods extending between the walls thereof and adapted to carry ornamenting members and said walls being provided with openings through which the rods may be removed whereby the ornamenting members are left embedded in the body of the foodstuff and a holder on the container having depending pin extensions adapted to pass through said ornamenting members to prevent shifting thereof during the food completing process.

4. A means for ornamenting foodstuff comprising a container, members passing therethrough and adapted to carry ornaments and a holder on the container having depending pin extensions adapted to pass through said ornaments to prevent shifting thereof during the food finishing process.

5. A means for ornamenting foodstuff comprising a container, a knock-down receptacle within the container, the opposite walls of the container and the receptacle being provided with a plurality of openings, rods extending between said walls and passing through said openings and adapted to carry edible members, plates carried by the walls of the container, plug receiving extensions on said plates, said extensions coinciding with the openings in the container, closure members in said extensions and plug members for said extensions arranged to cover the ends of the rods and force the closure members into position to seal the openings in said container wall.

6. A means for ornamenting foodstuff comprising a container, rods extending between the walls thereof and adapted to carry ornamenting members, the walls being provided with openings through which the rods may be removed whereby the ornamenting members are left embedded in the body of the foodstuff, means for closing the openings in the container at a point where the rods pass therethrough, means for locking the rods in position in said container and a vertically disposed holder on the container having depending pin extensions adapted to pass through said ornamenting members to prevent shifting thereof during the food completing process.

7. A means for ornamenting foodstuff comprising a container, a plurality of holders extending between the walls of said container for retaining edible food pieces in design formation in the body of the foodstuff held in the container, means for locking the holders in position in said container, said locking member being arranged to allow withdrawal of said holders from said container and a vertically disposed bridge member on the container and depending pin extension members adapted to pass through said bridge and through said ornamenting members to prevent shifting of the latter during the food completing process.

8. A means for ornamenting foodstuff including a separable container comprising end walls, a bottom piece engaging said end walls, and side walls supported by the bottom and fitting into said end walls, rods extending between the walls thereof and adapted to carry ornamenting members, said walls being provided with openings through which the rods may be removed whereby the ornamenting members are left embedded in the body of the foodstuff.

In testimony whereof I affix my signature.

ALBERT MARTIN. [L. S.]